United States Patent
Boecker et al.

(10) Patent No.: US 7,383,364 B2
(45) Date of Patent: Jun. 3, 2008

(54) DEVICE ADDRESS LOCKING TO FACILITATE OPTIMUM USAGE OF THE INDUSTRY STANDARD IIC BUS

(75) Inventors: Douglas Michael Boecker, Rochester, MN (US); Stephan Otis Broyles, Austin, TX (US); Hemlata Nellimarla, Austin, TX (US); Alwood Patrick Williams, III, Otsego, MI (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 10/631,065

(22) Filed: Jul. 31, 2003

(65) Prior Publication Data

US 2005/0027913 A1    Feb. 3, 2005

(51) Int. Cl.
*G06F 3/00* (2006.01)
(52) U.S. Cl. ............................. 710/36; 710/20; 710/21; 710/37
(58) Field of Classification Search ................. 710/36, 710/3–6, 9, 14–19, 26, 28, 37, 39, 55, 107–110, 710/113, 309, 119–220, 240–242
See application file for complete search history.

(56) References Cited

U.S. PATENT DOCUMENTS

| 5,535,416 | A  | * | 7/1996  | Feeney et al. ................. 710/14 |
| 5,887,194 | A  | * | 3/1999  | Carson et al. ................. 710/36 |
| 6,073,218 | A  | * | 6/2000  | DeKoning et al. ........... 711/150 |
| 6,401,110 | B1 | * | 6/2002  | Freitas et al. ................ 718/104 |
| 7,069,365 | B2 | * | 6/2006  | Zatorski ...................... 710/200 |
| 7,134,040 | B2 | * | 11/2006 | Ayres ............................ 714/4 |

OTHER PUBLICATIONS

Stephen D. Burd; System Architecture; 1998; Course Technology; 2nd Edition; pp. 73-78.*

* cited by examiner

*Primary Examiner*—Alford Kindred
*Assistant Examiner*—Richard B. Franklin, Jr.
(74) *Attorney, Agent, or Firm*—Duke W. Yee; Diana R. Gerhardt; Lisa L. B. Yociss

(57) ABSTRACT

A mechanism is provided for locking an end device for the period of time that the device is needed, thus disabling access by any other application or process. Having the device locked, rather than the bus, allows other applications to use the bus to access other devices at the same time. This is achieved by providing a virtual bus arbitration, which arbitrates applications' use of the physical bus. The virtual bus arbitration algorithms allow bus operations from different applications to overlap on the physical bus as long as their target devices and associated bus locks are on different end devices.

6 Claims, 3 Drawing Sheets

DEVICE ADDRESS LOCKING TO FACILITATE OPTIMUM USAGE OF THE INDUSTRY STANDARD IIC BUS

BACKGROUND OF THE INVENTION

1. Technical Field

The present invention relates to data processing systems and, in particular, to bus usage and arbitration in a data processing system. Still more particularly, the present invention provides a method, apparatus, and program for locking device addresses to facilitate optimum usage of an inter-integrated circuit bus.

2. Description of Related Art

A bus is a common pathway, or channel, between multiple devices. The computer's internal bus is known as the local bus, or processor bus. This type of bus provides a parallel data transfer path between the CPU and main memory and to the peripheral buses. A 16-bit bus transfers two bytes at a time over 16 wires. Likewise, a 32-bit bus uses 32 wires to transfer four bytes of data at a time. The bus is comprised of two parts: the address bus and the data bus. Addresses are sent over the address bus to signal a memory location, and the data is transferred over the data bus to that location.

Various other types of buses are used in data processing systems. In particular, an Inter-Integrated Circuit (IIC) bus is an example of another type of bus used in a data processing system. An IIC bus, also referred to as an I$^2$C bus, was developed by Koninklijke Philips Electronics NV, also known as Philips Semiconductors. Details and specifications on the protocols for this bus are found in The I$^2$C-Bus Specification, Version 2.1, January 2000. In this bus, one wire carries a clock signal, while another wire carries the data signal. This type of bus is used to provide interconnection between various devices, such as a flexible service processor (FSP), a memory, and a control panel. A flexible service processor is a processing unit that is used to initialize a data processing system. A FSP has its own boot code and operating system and may be connected to a number of input/output (I/O) devices.

In a complex embedded systems environment, a single IIC bus has several slave devices attached and multiple applications communicate with multiple end devices. In some cases, an application must access a device on the bus for a defined and continuous period of time. This may be achieved by placing a device soft lock on the bus usage or guarding the usage of the bus through a semaphore, until the application frees up the bus after transfer is complete.

One example of such a usage scenario is vital product data (VPD) collection or update on Squadrons. For read operations, the VPD application needs to access the Squadron electrically erasable programmable read only memory (SEEPROM), which in some cases may be of bigger memory size than the memory buffer size of the IIC controller hardware on the FSP cards. In such cases, the application needs to lock the bus until it reads all data on the SEEPROM chips, so that no other application can disrupt the operation by trying to access the same device on the same bus.

In the case of write operations, the VPD application may attempt to write, for example, 256 bytes. The memory chips may have an eight byte page write support. At the end of each page write, the end device goes into a write cycle (maximum 10 ms). The 256 byte write needs to be broken up into 32 eight-byte writes. After each of these 32 IIC write operations, there may be 10 ms idle bus time. The bus is locked by one such process even though there is idle bus time during the lock period, when other applications could possibly be using the bus to access other devices on the same bus.

Thus, the current arbitration mechanism of locking the bus creates a problem of bus hogging by one process. All other applications must wait until the application that has the lock frees the bus. Therefore, it would be advantageous to have an improved method, apparatus, and program instructions for device address locking to facilitate optimum usage of an inter-integrated circuit bus.

SUMMARY OF THE INVENTION

The present invention provides a mechanism for locking an end device for the period of time that the device is needed, thus disabling access by any other application or process. Having the device locked, rather than the bus, allows other applications to use the bus to access other devices at the same time. This is achieved in the present invention by providing a virtual bus arbitration, which arbitrates applications' use of the physical bus. The virtual bus arbitration algorithms allow bus operations from different applications to overlap on the physical bus as long as their target devices and associated bus locks are on different end devices.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
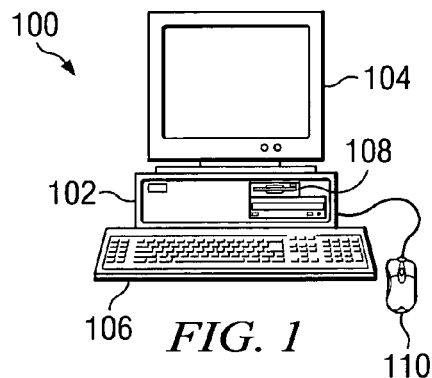
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
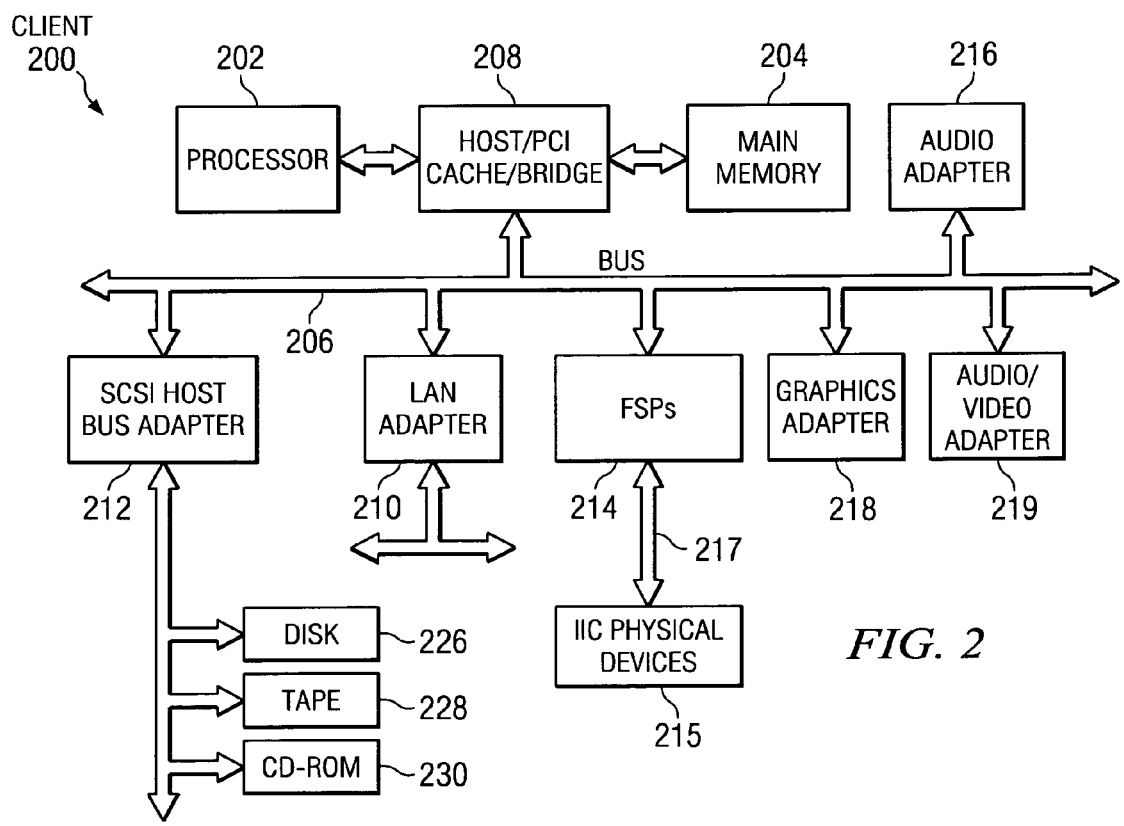
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212 and flexible service processors 214 are connected to PCI local bus 206 by direct component connection. In contrast, audio adapter 216, graphics adapter 218, and audio/video adapter 219 are connected to PCI local bus 206 by add-in boards inserted into expansion slots. Flexible service processors 214 provide PCI and IIC bus connections. In this example, flexible service processors 214 are connected to inter-internal control physical devices 215 by HG bus 217. Inter-internal control physical devices 215 includes components, such as a control panel, a flexible service processor, a power device, and a memory.

SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. Instructions for the operating system and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Figure 3:
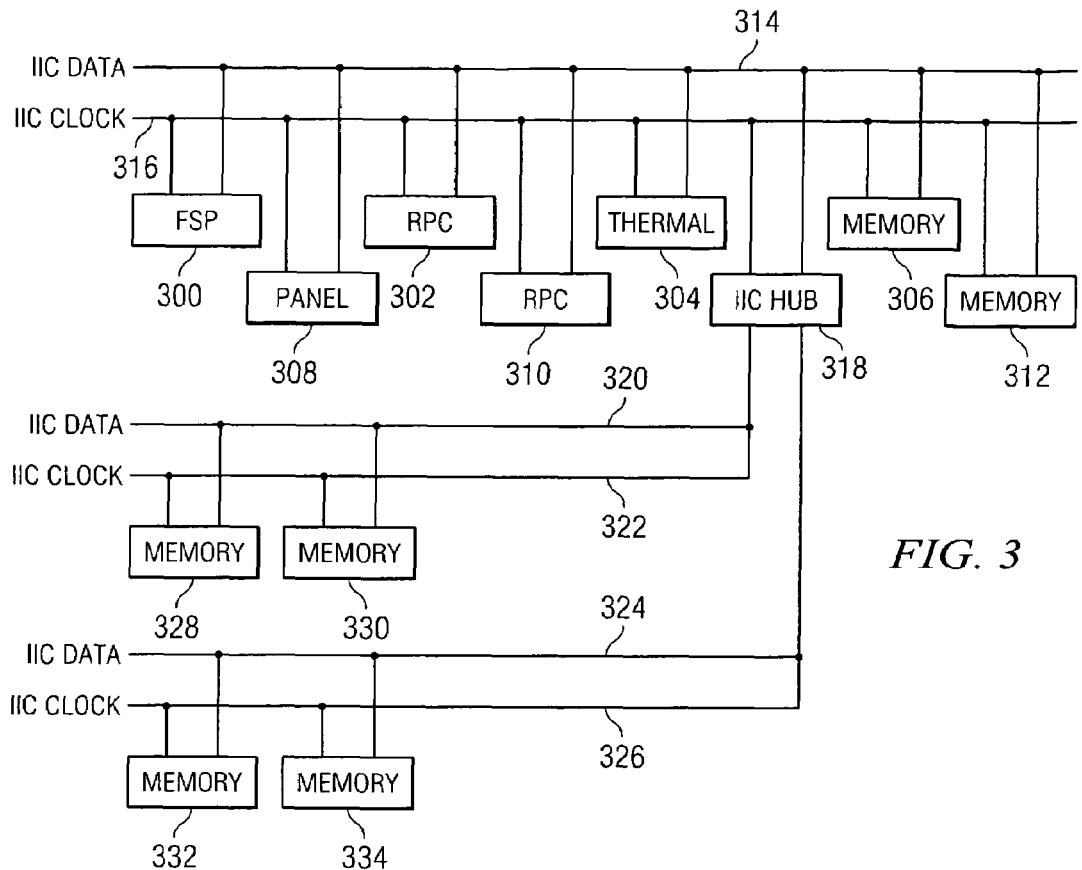
FIG. 3 is a diagram illustrating physical devices used in transferring data in accordance with a preferred embodiment of the present invention.

Turning next to FIG. 3, a diagram illustrating physical devices used in transferring data is depicted in accordance with a preferred embodiment of the present invention. The physical devices illustrated in FIG. 3 are similar to IIC physical devices 214 in FIG. 2.

In this example, flexible service processor (FSP) 300, rack power controller (RPC) 302, thermal unit 304, memory 306, panel 308, rack power controller 310, and memory 312 are connected to a primary IIC bus, which is formed by data line 314 and clock line 316. IIC hub 318 is also connected to data line 314 and clock line 316. This hub provides an interconnection for two additional IIC buses formed by data line 320, clock line 322, data line 324, and clock line 326 in this example. Memory 328 and memory 330 are connected to data line 320 and clock line 322. Memory 332 and memory 334 are connected to data line 324 and clock line 326.

As illustrated, flexible service processor 300 is a physical device that executes an operating system and is initialized prior to initializing the rest of the data processing system. Flexible service processor 300 includes components, such as nonvolatile memory, dynamic random access memory, a flash memory, and a controller to control various I/O devices. Rack power controller 302 and 310 are physical devices that provide control functions for power to a data processing system. Thermal unit 304 is a physical device providing temperature data. Panel 308 is a physical device, such as a panel with a power or reset button. Memory 306, memory 312, memory 328, memory 330, memory 332, and memory 334 are used to store data.

In this example, flexible service processor 300 acts as either a slave or master device in which a number of applications may execute. Panel 308, rack power controller 302, and rack power controller 310 may act as either slave or master devices. The memories illustrated are normally slave devices as well as thermal unit 304. IIC hub 318 is a master only for the sub-buses formed by data line 320, clock line 322, data line 324, and clock line 326. This hub is a slave on the primary bus formed by data line 314 and clock line 316.

The protocol for IIC buses supports I/O reads and writes in two different modes. One mode involves an I/O operation issued by a master, which is referred to as a master read/write. A second mode for I/O operations is a slave read/write, which is triggered by devices external to the system in consideration. In this example, the system in consideration may be flexible service processor 300, with external devices, such as rack power controller 302 and panel 308 triggering the slave I/O operations. Flexible service processor 300 is an embedded system, which includes applications having responsibility for physical devices attached to the IIC buses. Such a function requires flexible service processor 300 to operate as a slave.

Figure 4:
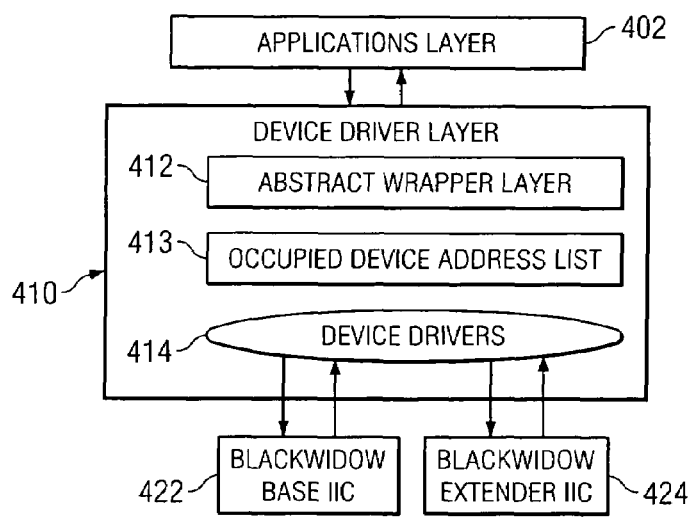
FIG. 4 is a block diagram depicting layers of abstraction in an inter-integrated circuit bus environment in accordance with a preferred embodiment of the present invention.

With reference now to FIG. 4, a block diagram depicts layers of abstraction in an inter-integrated circuit bus environment in accordance with a preferred embodiment of the present invention. Applications within application layer 402 communicate with the bus through device driver layer 410. The device driver layer 410 includes device drivers 414, which interacts directly with the target hardware and sets the hardware up for access.

Applications wishing to communicate with devices on the IIC hardware, including, for example, blackwidow base IIC 422 and blackwidow extender IIC 424, send requests through the device driver layer to probe for the particular end device on the bus. Blackwidow base and blackwidow extender are different chips pertaining to different hardware. These chips represent examples of hardware existing at the hardware level. The requests are sent through abstract wrapper layer 412 to device drivers 414. The abstract wrapper layer provides a wrapper to the device driver interfaces for the applications that need to use the hardware services.

Abstract wrapper layer 412 determines whether the device is available. If the device is available, the abstract wrapper layer places a lock on the device address, restricting its use by any other application. In the meantime, other applications that request access to any other device on the same bus can request a lock on that device. The device driver layer keeps a list 413 of occupied end device addresses and is responsible for locking the resources when transfers are ongoing and for releasing resources when transfers are complete.

Figure 5:
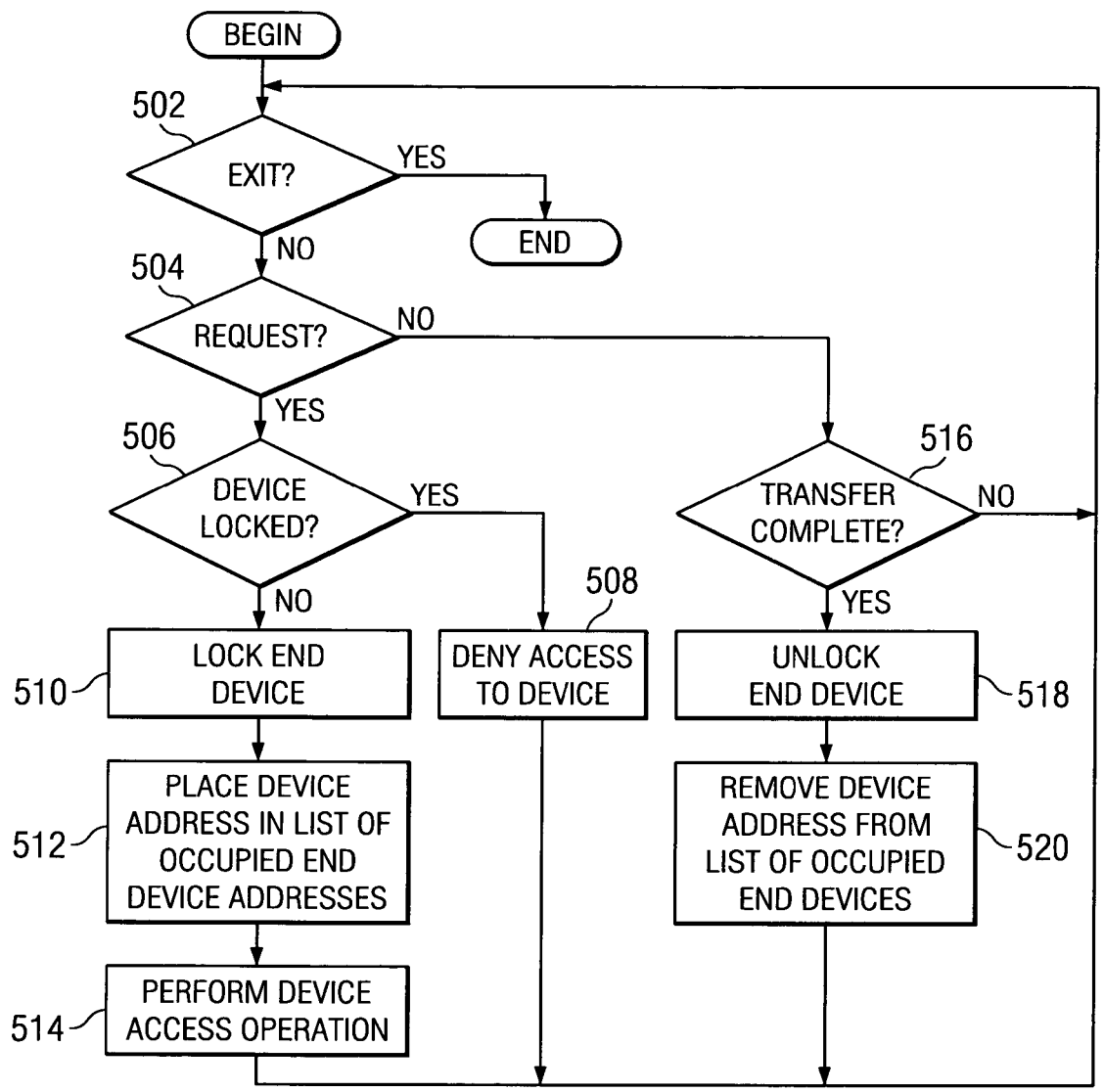
FIG. 5 is a flowchart illustrating the operation of a virtual arbitration mechanism in accordance with a preferred embodiment of the present invention.

Turning now to FIG. 5, a flowchart illustrating the operation of a virtual arbitration mechanism, such as abstract wrapper layer 412 in FIG. 4, is shown in accordance with a preferred embodiment of the present invention. The process begins and a determination is made as to whether an exit condition exists (step 502). An exit condition may exist, for example, when the data processing system shuts down or when the IIC bus fails or is taken off-line.

If an exit condition exists in step 502, the process ends; otherwise, a determination is made as to whether a request for access is received (step 504). A request for access preferably includes a device address for an end device on the IIC bus. If a request for access is received, a determination is made as to whether the device is locked (step 506). If the device is locked, the process denies access to the device (step 508). Then, the process returns to step 502 to determine whether an exit condition exists.

If the device is not locked in step 506, the process locks the end device (step 510) and places the device address in the list of occupied end device addresses (step 512). Thereafter, the process performs the device access operation (step 514) and returns to step 502 to determine whether an exit condition exists.

If a request is not received in step 504, a determination is made as to whether a transfer is completed. (step 516). If a transfer is not completed, the process returns to step 502 to determine whether an exit condition exists. If, however, a transfer is completed in step 516, the process unlocks the end device (step 518) and removes the device address from the list of occupied end devices (step 520). Then, the process returns to step 502 to determine whether an exit condition exists.

Thus, the present invention solves the disadvantages of the prior art by providing a mechanism for locking device addresses to optimize bus usage of the underlying hardware. The present invention eliminates bus hogging, meaning that while an application is performing a transfer to or from an end device on a bus, another application may access another such device on the same bus.

Furthermore, the mechanism of the present invention checks any bus malfunctions. If a processor is using the bus and hangs for some reason, another process can still get through the layers of software abstraction and probe the bus lines to determine the reason for the malfunction of the bus without depending upon the hardware probe/recovery mechanisms. The present invention can be further extended and utilized to keep a check on the number of devices that are being used currently on the bus and provide a method to control the bus traffic.

While the above examples are directed to an IIC bus, the present invention may also apply to other bus architectures. The emphasis of the present invention is on placing a lock on an end device, rather than the bus itself, in such a manner that chained activity on the bus is not restricted to only one end device at a time. Through the mechanism of the present invention, multiple applications can overlap activity on the bus even though certain device activity must be chained.

It is important to note that while the present invention has been described In the context of a fully functioning data processing system, those of ordinary skill in the art will appreciate that the processes of the present invention arc capable of being distributed in the form of a computer readable medium of instructions and a variety of forms and that the present invention applies equally regardless of the particular type of signal bearing media actually used to carry out the distribution. Examples of computer readable media include, recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing bus arbitration, the method comprising:

receiving, by a device driver layer from one of a plurality of applications included in an application layer, a request to perform a first device access operation on one of a plurality of end devices, the device driver layer including a plurality of device drivers that communicate with the plurality of end devices utilizing a bus;

each one the plurality of end devices being connected to the bus;

determining, by the device driver layer, whether the one of the plurality of end devices is locked;

responsive to the one of the plurality of end devices not being locked, locking, by the device driver layer, the one of the plurality of end devices and performing the first device access operation for the one of the plurality of applications;

responsive to the first device access operation completing, unlocking the one of the plurality of end devices; and another one of the plurality of applications performing a second device access operation to access another one of the plurality of end devices while the first device access operation is being performed, wherein the bus is not locked while the first device access operation is being performed and the one of the plurality of end devices is locked.

2. The method of claim 1, wherein the first device access operation is one of a read operation and a write operation.

3. The method of claim 1, further comprising:

responsive to the one of the plurality of end devices being locked, denying the first device access operation.

4. The method of claim 1, wherein the step of determining whether the one of the plurality of end devices is locked includes determining whether an address of the one of the plurality of end devices is found in a list of occupied ones of the plurality of end devices, wherein the plurality of end devices are separate and distinct end devices.

5. The method of claim 1, wherein the step of locking the one of the plurality of end devices includes placing a device address of the one of the plurality of end devices in a list of occupied ones of the plurality of end devices, wherein the plurality of end devices are separate and distinct end devices.

6. The method of claim 5 wherein the step of unlocking the one of the plurality of end devices includes removing the device address from the list of occupied ones of the plurality of end devices.

* * * * *